(No Model.)
G. H. FORBES.
DEVICE FOR ENABLING MOVING BODIES TO PASS OBSTRUCTIONS.
No. 506,037. Patented Oct. 3, 1893.
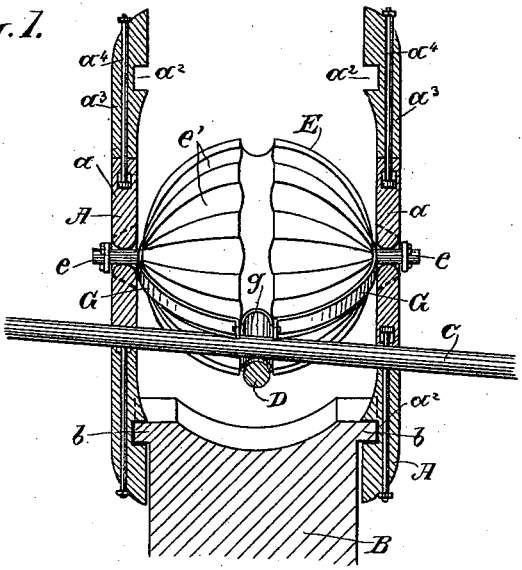
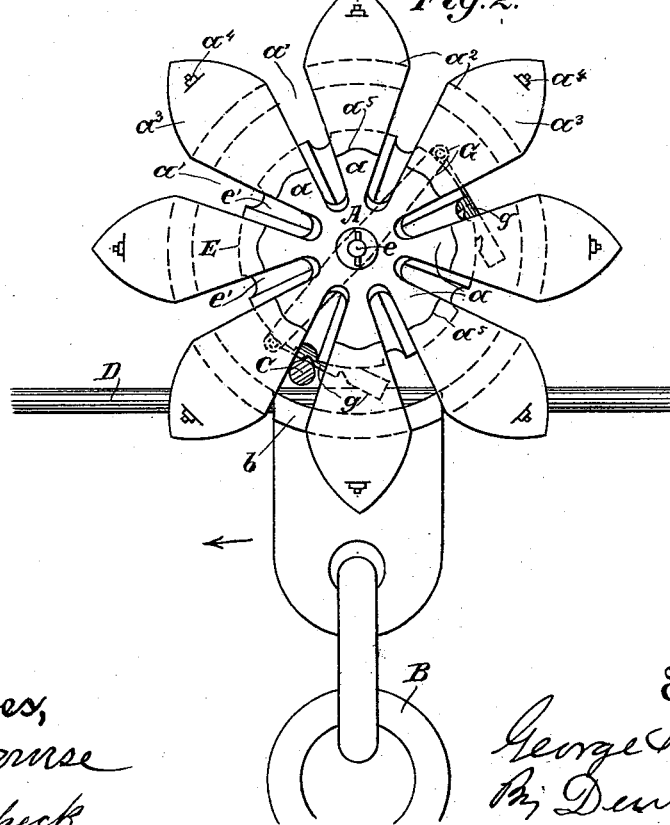
Witnesses,
Inventor,
George H. Forbes
By Dewey & Co.
Attys

UNITED STATES PATENT OFFICE.

GEORGE H. FORBES, OF SAN FRANCISCO, CALIFORNIA, ASSIGNOR OF ONE-FOURTH TO GEORGE P. PARKER AND LEO ALLENBERG, OF SAME PLACE.

DEVICE FOR ENABLING MOVING BODIES TO PASS OBSTRUCTIONS.

SPECIFICATION forming part of Letters Patent No. 506,037, dated October 3, 1893.

Application filed June 16, 1893. Serial No. 477,855. (No model.)

*To all whom it may concern:*

Be it known that I, GEORGE HENRY FORBES, a citizen of the United States, residing in the city and county of San Francisco, State of California, have invented an Improvement in Devices for Enabling Moving Bodies to Pass Obstructions; and I hereby declare the following to be a full, clear, and exact description of the same.

My invention relates to devices and mechanisms having for their object the enabling of moving bodies to which they are attached to pass obstructions.

It consists in the novel device and its connections which I shall hereinafter fully describe, and which is adapted to enable a load or other part of any moving device to pass obstructions which may lie in the path of travel.

Referring to the accompanying drawings for a more complete explanation of my invention,—Figure 1 is a vertical section, the carrying wheel being shown in full. Fig. 2 is a side elevation.

A is an axially turnable wheel, provided or formed with a series of radially projecting points or arms $a$ separated from each other by spaces $a'$ extending deep into the wheel. Let it be imagined that the wheel is moved along bodily but not necessarily turning on its axis, by some suitable power, and it will be seen that if a fixed obstruction, such as a cross wire or arm of any kind be met, then this obstruction coming in contact with one of the points or arms of the wheel, will turn the wheel on its axis, so that adjacent points or arms will embrace the obstruction which enters the space between them; and the wheel itself, by rotating under the impingement of the fixed obstruction, will pass over and beyond it, the latter entering the space from in front, and passing out from behind. If, now, this wheel should be let into a moving body and lie in the plane or line of its travel, completely traversing the body, as, for example, the grip of a cable railway, the grip will successfully pass an obstruction, such as a crossing cable, which cable will meet the arms of the wheel and by entering between them will allow the latter to turn over it, thereby permitting the grip to pass. The same is true of a load carried by the wheel, either supported above or suspended below, by suitable connection, as, for example, the following: In order to form a proper connection between this wheel and the part to which it is attached, I have, for an example, shown a suspended weight or load B which is provided with a curved tongue $b$ adapted to engage curved grooves $a^2$ on the arms or points $a$ of the wheel. This tongue is long enough to engage the grooves of at least two of the arms of the wheel, and this connection serves as an example for any suitable attachment which is adapted to be made and broken by the wheel arms successively in turning. Now, it will be seen that when a cross cable or cross wire, such as is represented by C, is encountered, the arm on the approaching side of the cross wire does not let go of the load until the arm on the receding side has come down in front of the cross wire and has reached its engagement with the load on that side, so that the load is transferred from one arm to the other successively, as these arms travel over and pass the obstructing wire.

In practice it will be best to have two such wheels as A, as I have here shown, so that they may engage the part with which they are connected on each side, and in cases where a direct bearing for this device is needed, as, for example, where it is merely used to carry a load on an elevated track or wire, such as is represented by D, there must be a carrying wheel which I have here represented by E and which travels on the wire. This carrying wheel and the two wheels A are all mounted independently of each other, as, for example, upon a central shaft on which they are all loosely mounted, or the wheels A may be mounted freely upon pins $e$ extending from the axis of the wheel E.

In order to permit the device to travel in curved lines, it is necessary that the outside wheels A may have movements at an angle to the vertical plane in which they travel in a straight line and to do this it is best to make the intervening or carrying wheel E of an approximately spherical shape, so that the side wheels may rock or tilt in and out thereon, and thus enable the device to turn curves.

Furthermore, in order to pass obstructions which meet the main line at a great inclination, it is best to make the spaces $a'$, between the points or arms of the wheel A extend very deep in toward the center, and to make in the surface of the carrying wheel E, grooves or channels $e'$ which work in harmony with the spaces of the wheels A, by allowing the cross or obstructing wires to fit into them when at a great angle. The extremities $a^3$ of the points $a$ of the wheel A may be rigid, but preferably they are made to turn, or swivel on longitudinal axes by reason of being formed of separate pieces connected by pivot pins $a^4$, the joint between the two being of an inclined or cam shape, as shown at $a^5$, whereby the tendency of the extremities is to return to a perfect joint after being turned out therefrom. The object of this is to reduce the friction on the points when coming in contact with the obstructing wire, as it is directed into the space between the points.

This device is useful in all instances in which a traveling body encounters obstructions, as, for example, in the transportation of loads on overhead wires where other wires must be encountered and passed; also in the operation at the crossings of cable roads, it being obvious that the wheel A will roll over any obstruction adapted to pass between its arms or points; and said wheel, by proper connection with the part to which it is attached, will carry said part with it.

Where the carrying wheel E is used, and an obstructing wire such as C lies above the track wire D, I provide the bars G. These are pivotally balanced at their centers, and carry short links $g$ at each end, which hang down by gravity in front of the tread of wheel E. They are preferably notched as shown, to engage the overlying wire C, and they then are pressed into the tread of the wheel and form temporary tracks on which said wheel may ride over the wire C without jar. This throws the front links to the back, by the turning of the bars G on their pivots, and the back links are thereby thrown to the front ready for the next action.

Having thus described my invention, what I claim as new, and desire to secure by Letters Patent, is—

1. A device for enabling moving bodies to pass obstructions, consisting of a wheel, rotatable about its axis, and having a series of spaced radial points or arms provided with swiveled extremities and adapted to receive the obstruction between them and by contact therewith to pass by said obstruction as the wheel rotates, and a connection between said wheel and the body to which it is attached, lying out of line of the obstruction, and adapted to permit the axial rotation of the wheel, substantially as herein described.

2. A device for enabling moving bodies to pass obstructions, consisting of a wheel rotatable about its axis and having a series of spaced radial points or arms provided with swiveled extremities and adapted to receive the obstruction between them and by contact therewith to pass by said obstruction as the wheel rotates, and a connection between the arms of said wheel and the body to which it is attached, said connection lying out of line of the obstruction and adapted to be successively made and broken by the arms as they pass over the obstruction, substantially as herein described.

3. A device for enabling moving bodies to pass obstructions, consisting of a wheel rotatable about its axis and having a series of spaced radial points or arms provided with swiveled extremities and adapted to receive the obstruction between them and by contact therewith to pass by said obstruction as the wheel rotates, and a connection between the arms of said wheel and the body to which it is attached, said connection lying out of line of the obstruction and adapted to be successively made and broken by the arms as they pass over the obstruction, consisting of inter-engaging tongues and grooves fitting and sliding on each other, substantially as herein described.

4. A device for enabling moving bodies to pass obstructions, consisting of an axially rotatable wheel having an annular series of radially projecting separated or spaced points or arms, adapted to receive the obstruction between them and by contact therewith to pass by said obstruction as the wheel rotates, an independently rotatable carrying wheel mounted on an axis common to both wheels, and a connection between the arms of the first named wheel and the body to which it is attached, lying out of line of the obstruction and adapted to permit the axial rotation of the wheel, substantially as herein described.

5. A device for enabling moving bodies to pass obstructions, consisting of a carrying wheel, a wheel on each side thereof and independently turnable about the axis of the same, said wheels having radially projecting arms or points separated to form spaces between them through which the obstruction passes, and a connection between the arms of said side wheels and the body to which they are attached, lying out of line of the obstruction and adapted to permit the axial rotation of said wheels, substantially as herein described.

6. A device for enabling moving bodies to pass obstructions consisting of the central carrying wheel having the series of grooves in its sides, the freely turnable wheels A on each side provided with spaced radially projecting arms or points, and the tongue and groove connection between said arms and the body with which they are connected, substantially as herein described.

7. A device for enabling moving bodies to pass obstructions consisting of a wheel axially turnable and having a series of spaced radially projecting points or arms, the extremities of which are swiveled, and a connection between the arms and the body to which they are attached adapted to be made and broken by successive arms as they turn, substantially as herein described.

8. A device for enabling moving bodies to pass obstructions, consisting of an axially turnable wheel having a series of spaced radially projecting arms or points between which the obstruction passes, a connection between said arms and the body to which they are attached adapted to be made and broken by successive arms as they turn, a carrying wheel mounted on a common axis with the first named wheel and independently rotatable, and the pivoted bar G with its links $g$ forming temporary tracks for the carrying wheel to ride over the obstruction, substantially as herein described.

In witness whereof I have hereunto set my hand.

GEORGE H. FORBES.

Witnesses:
S. H. NOURSE,
WM. F. BOOTH.